UNITED STATES PATENT OFFICE.

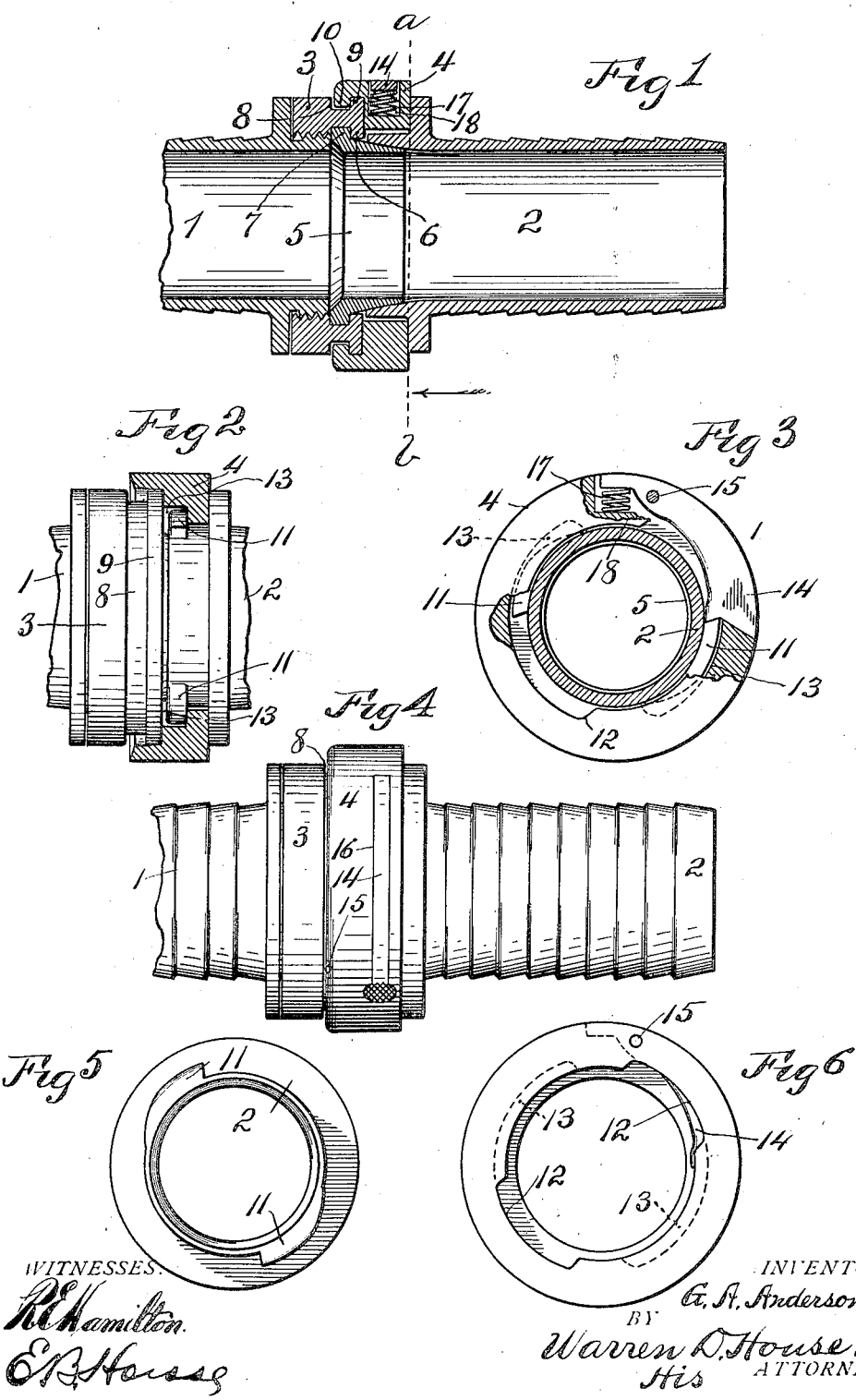

GUSTAF A. ANDERSON, OF KANSAS CITY, KANSAS.

HOSE-COUPLING.

935,082.

Specification of Letters Patent. Patented Sept. 28, 1909.

Application filed December 7, 1908. Serial No. 466,347.

*To all whom it may concern:*

Be it known that I, GUSTAF A. ANDERSON, a citizen of the United States, residing at Kansas City, in the county of Wyandotte and State of Kansas, have invented certain new and useful Improvements in Hose-Couplings, of which the following is a specification.

My invention relates to improvements in hose couplings.

The object of my invention is to provide a hose coupling with which connections and disconnections between two sections of hose may be quickly made, and which will permit relative rotation and effect at the same time a tight joint between the two sections which it connects.

The novel features of my invention are hereinafter fully described and claimed.

In the accompanying drawings illustrative of my invention, Figure 1 is a longitudinal sectional view of my improved coupling. Fig. 2 is a fragmentary view partly in side elevation and partly in section, the outer annular member being shown as it is before the end flange is turned into the peripheral groove in the inner annular member. Fig. 3 is a cross section on the dotted line *a—b* of Fig. 1, a portion of the outer annular member being broken away. Fig. 4 is a side elevation of the coupling. Fig. 5 is an end view of one pipe section. Fig. 6 is an end view of the outer annular member.

Similar characters of reference denote similar parts.

1 and 2 denote two pipe sections to which are adapted to be secured two sections of hose, not shown.

3 and 4 denote the inner and outer annular members which are swiveled axially to each other and have means for being releasably secured to the pipe sections 1 and 2 respectively as will hereinafter be described.
A sealing ring 5 is clamped between one annular member and the pipe section connected thereto and is adapted to fit into the other pipe section.

In its preferable form my improved coupling is constructed as follows:—

The inner annular member 3 is internally screw threaded at one end, the threaded portion being fitted to the externally screw threaded end of the pipe section 1. The member 3 is provided with an inner annular flange 6 against which is tightly clamped by the adjacent end of the pipe section 1 the annular peripheral flange 7 provided at one end of the ring 5 the other end of which is preferably tapering and fitted within the adjacent end of the pipe section 2. The sealing ring 5 is preferably expansible and made of resilient material, such as soft rubber, so that when there is a water pressure in the coupling the ring 5 will expand and bear tightly against the inner wall of the pipe section 2.

The annular member 3 is provided with a peripheral annular groove 8 and a peripheral annular shoulder or flange 9. The annular member 4 encircles the flange or shoulder 9 and embraces opposite sides of said flange or shoulder to prevent detachment from each other of the members 3 and 4 while permitting axial rotation of said members relative to each other. In constructing the coupling the member 4 is preferably made as shown in Fig. 2 with an end recess in which the flange 9 is slipped after which the adjacent end of the member 4 is turned inwardly to form an annular flange 10 which enters the groove 8, as shown in Fig. 1.

One end of the pipe section 2 is provided with two oppositely disposed peripheral shoulders 11 which are adapted to enter end notches 12 provided in one end of the member 4 when the pipe section is inserted in said member. Intermediate the notches 12 in the member 4 are inner peripheral recesses 13 which are adapted to receive the shoulders 11 when the pipe section has been inserted in the member 2 and rotated to the proper position represented in Fig. 3.

To releasably hold the pipe section 2 against rotation from the locked position just described a lever 14 is pivoted on a pin 15 within a transverse recess 16 in the member 4. The lever 14 serves as a pawl for engaging one of the shoulders 11 when the pipe section 2 has been inserted in the member 4 and turned to the position shown in Fig. 3.

A coil spring 17 disposed in a radial recess 18 in the periphery of the member 4 bears against the inner side of the lever 14 adjacent to one end thereof and normally forces the opposite end of the lever into a position for engaging the adjacent shoulder 11.

In making a coupling connection between two sections of hose, the pipe section 2 is inserted in the annular member 4 and turned to the position shown in Fig. 3, at which time the lever 14 falls to the rear of the adjacent shoulder 11 and prevents retractive rotation of the pipe section in the member 4.

To disconnect the pipe section from the member 4 it is but necessary to depress the end of the lever 14 immediately over the spring 17, thus swinging said lever so that the shoulder 11 previously engaged by the lever is freed therefrom, after which the pipe section 2 is rotated until the shoulders 11 aline with the notches 12, at which time the pipe section may be withdrawn from the member 4.

The members 3 and 4 being axially swiveled to each other the pipe sections 1 and 2 may freely rotate in either direction any number of times, thus permitting the twisting in the hose due to coiling or uncoiling to be readily eliminated, the water pressure in the hose sufficing to effect this result automatically when water is turned into the hose.

Modifications of my invention, within the scope of the appended claims, may be made without departing from its spirit.

Having thus described my invention, what I claim and desire to secure by Letters Patent, is:—

1. A hose coupling comprising two pipe sections, two annular members swiveled to each other and having means for releasably engaging said pipe sections respectively, and a sealing ring clamped between one pipe section and one of said annular members and adapted to fit within the other pipe section.

2. A hose coupling comprising two pipe sections, two annular members swiveled to each other and having means for releasably engaging said pipe sections respectively, and an expansible ring clamped between one pipe section and one of said annular members and adapted to fit within the other pipe section.

3. A hose coupling comprising two pipe sections, one of which has a screw threaded end, two annular members swiveled to each other, one annular member having a threaded portion fitted to the threaded end of the screw threaded pipe section, the other annular member having means for being detachably secured to the other pipe section, and a sealing ring clamped between one pipe section and one of said annular members and adapted to fit within the other pipe section.

4. A hose coupling comprising two pipe sections, two annular members rotative axially one relative to the other and having means for releasably engaging said pipe sections respectively, one annular member having a peripheral annular flange encircled and engaged upon opposite sides by the other annular member, and a sealing ring clamped between one pipe section and one annular member and adapted to fit within the other pipe section.

5. A hose coupling comprising two pipe sections, two annular members rotative axially one relative to the other and having means for releasably engaging said pipe sections respectively, one annular member having an annular peripheral groove, and the other annular member having an annular flange disposed in said groove, and a sealing ring clamped between one pipe section and one annular member and adapted to fit within the other pipe section.

6. A hose coupling comprising two pipe sections, one of which has a screw threaded end, two annular members rotative axially one relative to the other, one annular member having a threaded portion fitted to the screw threaded end of the threaded pipe section, the other annular member having means for being detachably secured to the other pipe section, one annular member having a peripheral annular flange encircled and embraced upon opposite sides by the other annular member, and a sealing ring clamped between one pipe section and the annular member which is secured thereto and adapted to fit within the other pipe section.

7. A hose coupling comprising two pipe sections, one having a screw threaded portion and the other having a peripheral shoulder, two annular members one having a threaded portion fitted to the threaded pipe section, the other annular member being adapted to receive the shouldered end of the other pipe section and having a recess to receive said shoulder when the shouldered pipe section is turned to the proper position, the annular members being swiveled axially to each other, releasable means for holding the pipe section with the shoulder against rotation to a position in which the shoulder is clear of said recess, and a sealing ring clamped between one pipe section and the annular member secured thereto and adapted to fit within the other pipe section.

8. A hose coupling comprising two pipe sections, two annular members swiveled axially to each other and having means for releasably engaging said pipe sections respectively, one annular member having an inner peripheral annular flange, and a sealing ring having a peripheral flange clamped between the flange of the annular member and the pipe section secured to the flanged annular member and adapted to fit within the other pipe section.

9. A hose coupling comprising two pipe sections one of which is provided with a screw threaded portion, two annular members swiveled axially to each other, one member having a threaded portion fitted to the threaded portion of the threaded pipe section and having an inner annular peripheral flange, the other annular member having means for being detachably secured to the other pipe section, and a sealing ring having a peripheral flange clamped between the flange of the flanged annular member and the end of the threaded pipe section and adapted to fit within the other pipe section.

10. A hose coupling comprising two pipe sections one of which has a screw threaded end, two annular members swiveled axially to each other, one member having a threaded portion fitted to the threaded end of the threaded pipe section, the other annular member having means for being detachably secured to the other pipe section, and an expansible ring clamped between the threaded pipe section and the annular member secured thereto and adapted to fit within the other pipe section.

In testimony whereof I have signed my name to this specification in presence of two subscribing witnesses.

GUSTAF A. ANDERSON.

Witnesses:
  E. B. HOUSE,
  WARREN D. HOUSE.